Sept. 1, 1959  A. WINKLER ET AL  2,902,231
FILM SPOOL BEARING FOR PHOTOGRAPHIC CAMERAS OR THE LIKE
Filed March 10, 1954

INVENTORS:
ALFRED WINKLER
WILLY KADEN
BY
THEIR ATTORNEYS

United States Patent Office 2,902,231
Patented Sept. 1, 1959

2,902,231

FILM SPOOL BEARING FOR PHOTOGRAPHIC CAMERAS OR THE LIKE

Alfred Winkler and Willy Kaden, Munich, Germany, assignors to AGFA Aktiengesellschaft Application March 10, 1954, Serial No. 415,342

Claims priority, application Germany March 31, 1953

4 Claims. (Cl. 242—71.3)

This invention relates to a mounting for film spools in a camera or the like.

The mountings for film spools, heretofore generally used, are either of such complex construction that an unwarranted amount of time, energy and cost are necessary to their manufacture, or are of such primitive construction that they are incapable of operating appropriately.

In order to avoid the above disadvantages, this invention contemplates the provision of a film spool mounting comprising a removable nut member, in which is adjustably positioned an axially movable threaded shaft. According to the invention, the nut is rigidly positioned at the bottom of a camera casing, and extending through the axial opening in the nut is the threaded shaft, the threads of which have a pitch of at least 45 degrees. For adjusting purposes, the nut is provided with a slot which extends at right angles to the axis of the shaft. The detents formed by the slot are connected to each other by a set-screw or the like which is used to adjust the detents relative to each other. If desired, a resilient device such as a spring may be substituted for the set-screw.

On the end of the threaded shaft which projects outside of the camera casing, there is formed an actuating disc. This actuating disc is provided on its inner surface with a pin, lug or the like which is so arranged relative to the removable rear wall of the camera that this wall can only be placed in closed position when the threaded shaft is in its screwed-in position. The rear wall is provided with a slot for receiving the pin on the disc and acts to prevent further rotation of the threaded shaft.

The advantages of the described arrangement lie not only in the fact that, due to the simple, practical and distinct construction, only few and relatively inexpensive parts are required, but lie also in the fact that the film spool after insertion into the camera is adapted to be adjusted to any desired position.

It is, therefore, one object of this invention to provide a simple and inexpensive mounting for a film spool in a camera.

Another object of this invention is to provide a mounting for a film spool in a camera which is adjustable from outside the camera.

Figure 1:
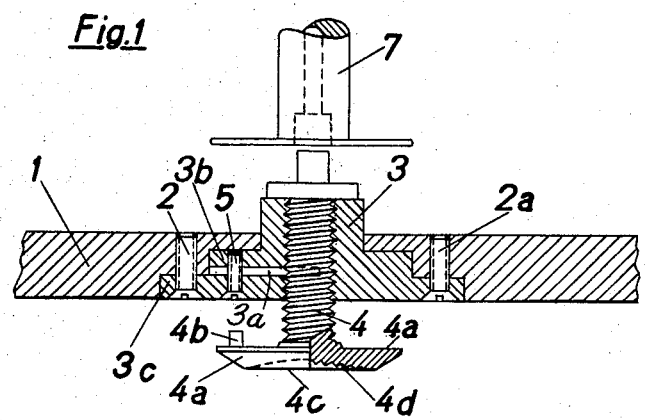
Figure 2:
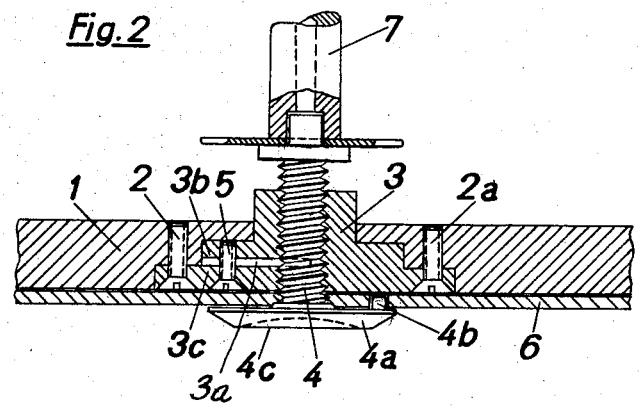
Figure 3:
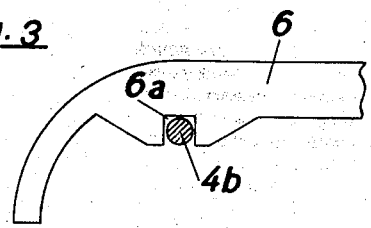

Other objects and many of the attendant advantages of this invention will be readily appreciated as the same becomes better understood by reference to the following detailed description when considered in connection with the accompanying drawings wherein:

Fig. 1 shows a fragmentary view of the bottom of a camera with the mounting for the film spool thereon and with the threaded shaft in forward position, Fig. 2 is a view similar to Fig. 1 but with the threaded shaft in rearward position, and Fig. 3 is a view showing the relationship between the pin on the adjusting disc and the slot in the camera rear wall.

Referring now in greater detail to the drawing wherein similar reference characters refer to similar parts, there is shown a nut or sleeve member 3 which is attached to the bottom of the camera 1 by screws 2, 2a; the threaded shaft 4 being located in the nut member. For adjusting purposes, the nut member is provided with a slot 3a which extends at right angles to the threaded shaft axis. By providing the slot in the nut 3, two teeth or detents are obtained which are connected with each other by means of a set screw 5. The screw 5 can be adjusted to clamp the teeth together to a greater or lesser extent. The part of the threaded shaft lying outside of the camera case is provided with an actuating disc 4a. For simpler operation this actuating disc can be formed slightly concave on its bottom side 4c and can be made rough and champfered as indicated, for example, by serrated surface 4d. A pin, lug or the like 4b is rigidly attached to the disc surface 4a which faces the bottom of the camera. The pin 4b is arranged relative to the back wall 6 of the camera in such a manner that this back wall 6 only can be closed if the threaded shaft is in the position of Fig. 2. A slot 6a is arranged in the back wall 6 of the camera as shown in Fig. 3 in order to prevent the threaded shaft 4b from being displaced or twisted. Back or rear wall 6 is shown in the closed position in Figs. 2 and 3, and the adjacent portions of the camera are shown in Fig. 1 in the positions that they assume when back or rear wall 6 is in the open position. Back or rear wall 6, for example, thereby constitutes a removable wall member which is adapted to engage interlocking means constituted, for example, by pin 4b. The film spool, only shown partly, is indicated by the reference number 7.

In operation, the shaft 4 is threaded through the nut until the desired position at which it engages within the end socket in spool 7 is reached and then member 6 is put in place; the set-screw 5 or its equivalent, may be adjusted to urge the two detents closer against each other, thereby effecting somewhat of a binding effect on the thread of the shaft 4.

Obviously many modifications and variations of the present invention are possible in the light of the above teachings. It is, therefore, to be understood that within the scope of the appended claims the invention may be practiced otherwise than as specifically described.

What is claimed is:

1. A photographic device comprising a casing with a removable wall member which is movable from a closed position to an opened position for opening said casing, an internally threaded sleeve fixed to a wall of said casing, an externally threaded shaft extending through said sleeve and being axially displaceable within said sleeve between an operative position and a non-operative position, said shaft providing means for bearing a rotatable spool within said casing when said shaft is in its operative position, said bearing means being stationary during rotation of said spool, actuating means on an external portion of said shaft for imparting an axially displacing force thereto, and interlocking means applied to said actuating means and adapted to be engaged by said removable wall member of said casing so that actuation of said shaft is prevented when said removable wall member of the casing is in said closed position.

2. The device of claim 1 wherein said removable member of said casing and said interlocking means are constructed and arranged to permit said removable wall member to be transduced from its opened position to its closed position only when said shaft is in said operative position.

3. The device of claim 1 wherein said actuating means is a disc and said interlocking means is a pin on said disc, and said removable wall member includes an open slot for engaging said pin.

4. The device of claim 1 wherein said internally threaded sleeve is provided with adjustable clamping means for effecting a binding action on the threads of said sleeve and of said shaft.

References Cited in the file of this patent

UNITED STATES PATENTS

| | | |
|---|---|---|
| 1,118,512 | Power | Nov. 24, 1914 |
| 1,313,285 | Gallmeier | Aug. 19, 1919 |
| 2,063,330 | Nagel | Dec. 8, 1936 |
| 2,160,710 | Roehrl | May 30, 1939 |
| 2,219,722 | Lloyd | Oct. 29, 1940 |
| 2,241,122 | Drotning | May 6, 1941 |
| 2,245,214 | Mihalyi | June 10, 1941 |

FOREIGN PATENTS

| | | |
|---|---|---|
| 516,506 | Germany | Jan. 29, 1931 |